United States Patent [19]

Suga et al.

[11] Patent Number: 5,379,051
[45] Date of Patent: Jan. 3, 1995

[54] METHOD AND APPARATUS FOR REARRANGING AND DISPLAYING LINE DATA

[75] Inventors: Kazumi Suga; Taketo Hasegawa, both of Yokohama, Japan

[73] Assignee: Canon Kabushiki Kaisha, Tokyo, Japan

[21] Appl. No.: 58,357

[22] Filed: May 10, 1993

[30] Foreign Application Priority Data

May 19, 1992 [JP] Japan .................................. 4-126147

[51] Int. Cl.$^6$ .............................................. G09G 3/36
[52] U.S. Cl. .................................... 345/97; 345/196
[58] Field of Search ............ 340/784, 799, 798, 765, 340/803, 804; 345/55, 87, 97, 98, 185, 196; 359/54, 56, 59

[56] References Cited

U.S. PATENT DOCUMENTS

| | | | |
|---|---|---|---|
| 4,236,228 | 11/1980 | Nagashima et al. | 340/799 |
| 4,693,563 | 9/1987 | Harada et al. | 340/784 |
| 5,091,723 | 2/1992 | Kanno et al. | 340/784 |

FOREIGN PATENT DOCUMENTS

| | | |
|---|---|---|
| 0368117 | 5/1990 | European Pat. Off. . |
| 0368117 | 5/1990 | European Pat. Off. . |
| 0478381 | 4/1992 | European Pat. Off. . |
| 63-65494 | 3/1988 | Japan . |
| 2131286 | 5/1990 | Japan . |
| 2230924 | 10/1990 | United Kingdom . |

Primary Examiner—Alvin E. Oberley
Assistant Examiner—Chanh Nguyen
Attorney, Agent, or Firm—Fitzpatrick, Cella, Harper & Scinto

[57] ABSTRACT

A display control apparatus of a display device which uses a ferroelectric liquid crystal as an operational medium to display or update image data comprises a data storage unit to store data which is displayed on a display device, a supplying unit to supply data to the data storage unit, a detector to detect a difference between the data supplied to the supplying unit and the data displayed at present on the display device, a memory to store data indicative of the result of the detection by the detector, a controller to supply the data stored in the data storage unit to the display device on the basis of the result of the detection stored in the memory, and a counter to count the number of different bits of the line detected by the detector. The detector detects such a difference for every line of the display device. The controller preferentially supplies the data to the display device in descending order of the number of bits counted for each line.

8 Claims, 8 Drawing Sheets

METHOD AND APPARATUS FOR REARRANGING AND DISPLAYING LINE DATA

BACKGROUND OF THE INVENTION

1. Field of the Invention

The present invention relates to a display control apparatus and method and, more particularly, to a display control apparatus and a display control method of a display apparatus which uses, for example, a ferroelectric liquid crystal as an operational medium to display and update.

2. Related Background Art

Hitherto, a CRT display is mainly used as a computer dips lay. However, since the CRT display needs a certain degree of length in the thickness direction of the display screen, it is difficult to miniaturize the whole display apparatus. A liquid crystal display has been proposed (hereinafter, referred to as an LCD) as a display to solve such a drawback. At present there are several types of LCDS. For example, there are a high time division driving method (STN) of the twisted nematic liquid crystal and a method (NTN) to perform a black and white display as a modification of the STN method. There is also a plasma display method using a plasma discharge. In all of the above methods, the in,-age data transfer is the same as that of the CRT and the screen updating method is based on the non-interlacing method using a frame frequency of 60 Hz or higher. Therefore, the total number of scanning lines forming one screen lies within a range from 400 to 480. An LCD of a large size such that the total number of scanning lines is equal to or larger than 1000 has not yet been put into practical use. This is because since the display elements of those display panels do not have a memory performance in terms of the driving principle, a refresh cycle of the frame frequency of 60 Hz or higher is needed to prevent a flickering. Therefore, one horizontal scan time is a short time of 10 to 50 μsec or less and, when the number of scanning lines is increased, a good contrast is not derived.

The ferroelectric liquid crystal display apparatus (hereinafter, referred to as an FLCD) can realize a display of a large screen and a high fineness which fairly exceeds the above display apparatus. However, since a frame frequency to drive the FLCD is low, a high-order interlace (multi-interlace) cannot help being used.

However, when image data is displayed by using the multi-interlace, what is called a "flickering" occurs when an object (for example, a cursor, character, icon, another figure, or the like) displayed in the screen is moved or newly produced, so that there is problem such that the display quality is remarkably deteriorated.

There is what is called a "partial rewriting" method as means for preventing the "flickering" of an object in the screen in the multi-interlace mode. According to this method, in the movement, production, or the like of an object in the screen, a line region in which the display of the screen changes is temporarily displayed in the non-interlace mode. As a method of realizing such a partial rewriting method, for example, there have been proposed the methods as disclosed in JP-A-63-65494, Japanese Patent Application No. 63-285141 (U.S. Pat. No. 5,091,723), and the like. However, to consideration is made with respect to a counter measure in case of displaying a moving image, a still image, or the like on the same screen.

At present, on the other hand, since the FLCD has a feature such that the ferroelectric liquid crystal can hold only binary values, a process such that analog gradations are provided for color by varying an applying voltage or the like cannot be performed. Therefore, only the 16-color display of each bit of RGBI (I denotes a white bit) can be executed. When the user tries to display a moving image or the like, a lack of power of express ion causes a problem.

SUMMARY OF THE INVENTION

It is an object of the present invention to provide a display control apparatus in which a moving image or a still image of a full color, a text of a multi-color, or the like can be displayed on the same screen of a display apparatus at a high speed and a high quality and also to provide a display method which can realize such a display control apparatus.

Another object of the invention is to provide a display control apparatus in which a display changed portion is detected every line and the line of a large changed portion is preferentially changed.

BRIEF DESCRIPTION OF THE DRAWINGS

FIG. 1 is a block diagram of an information processing system in which an FLC display apparatus having a display control apparatus according to an embodiment is used as a display apparatus of various kinds of characters, image information, or the like;

DETAILED DESCRIPTION OF THE PREFERRED EMBODIMENTS

A display control apparatus according to an embodiment of the present invention, which will be explained hereinafter, comprises memory means for storing data of six or eight bits of each of R, G, and B data generated from a host computer, data converting means for binarizing the data into the ON or OFF information of each bit of RGBI (red, green, blue, white) of the FLCD, thereby converting the data which can be displayed as an image of sixteen colors, data converting means for further executing an image process after completion of the binarization, thereby converting the data into the data which can be displayed as a full-color image; transfer control means for discrimination, the data to be displayed in a full-color mode and the data to be displayed in a 16-color mode in the data of six or eight bits of each of RGB and for transferring to proper one of the above data converting means; external input control means for transferring an external input such as a video input or the like to the data converting means as data to be full-color displayed; display data memory means for respectively storing the binarized data and the preceding data which has been transferred; partial rewriting means for reading out the image data from the memory means and for extracting the rewritten lines, thereby executing a partial rewriting operation; and cursor control means for directly displaying a cursor image by the FLCD without writing into the display data memory means.

According to the above construction, for example, the full-color display of a moving image or a still image such as a video input or the like and the 16-color display of a text or the like can be realized on the same screen.

An embodiment of the present invention will now be described in detail hereinbelow.

Figure 1:
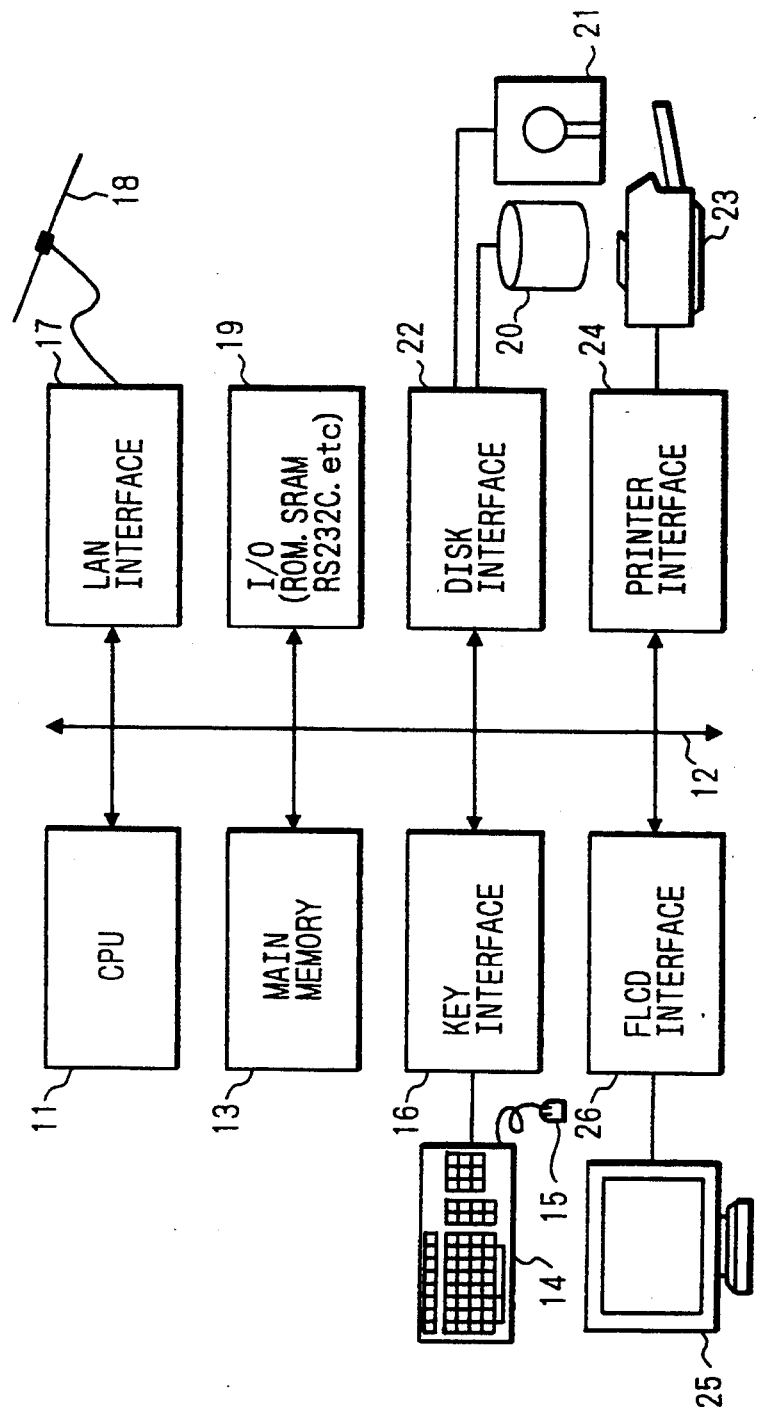

FIG. 1 is a block diagram of an information processing system in which an FLC display apparatus having a display control apparatus according to an embodiment of the invention is used to display various kinds of characters, image information, or the like.

In the diagram, reference numeral 11 denotes a CPU to control the whole information processing system; 13 a main memory including a ROM to store programs which are executed by the CPU 11 and a RAM which is used as a work area when the programs are executed; 14 a keyboard to input character information such as various kinds of characters or the like, control information, or the like; 15 a mouse as a pointing device; 16 a key interface to connect signals between the keyboard 14 or mouse 15 and the system; 17 an LAN interface between an LAN (local area network) 18 and the system; and 19 an input/output device (hereinafter, referred to as an I/O) having a ROM, a SRAM, an interface of the RS232C type, and the like. Various kinds of external apparatus can be connected to the I/O 19. Reference numerals 20 and 21 denote a hard disk device and a floppy disk device as external memory devices; 22 a disk interface to connect signals between the hard disk device 20 or the floppy disk device 21 and the system; 23 a printer which can be constructed by an ink jet printer, a laser beam printer, or the like which can record at a relatively high resolution (for example, 400 dots per inch); 24 a printer interface to connect signals between the printer and the system; and 25 an FLCD whose display operation is controlled by an FLCD interface 26. The FLCD has a display Screen using a ferroelectric liquid crystal as a display operational medium. Reference numeral 12 denotes a system bus comprising a data bus, a control bus, an address bus to connect signals among the above various kinds of apparatuses.

In the information processing system to which the foregoing various kinds of apparatuses or the like are connected, the user generally operates in correspondence to various information which are displayed on the display screen of the FLCD 25. That is, character or image information or the like which is supplied from an external apparatus which is connected to the LAN 18 or I/O 19 or from a keyboard 14, mouse 15, hard disk device 20, or floppy disk device 21, operation information of the system operation for the user stored in the main memory 13, or the like is displayed on the display screen of the FLCD 25. The user executes the edition of information or the instruction or operation to the system while looking at the display contents. The above various kinds of apparatuses construct display information supplying means to the FLCD 25, respectively.

Figure 2:
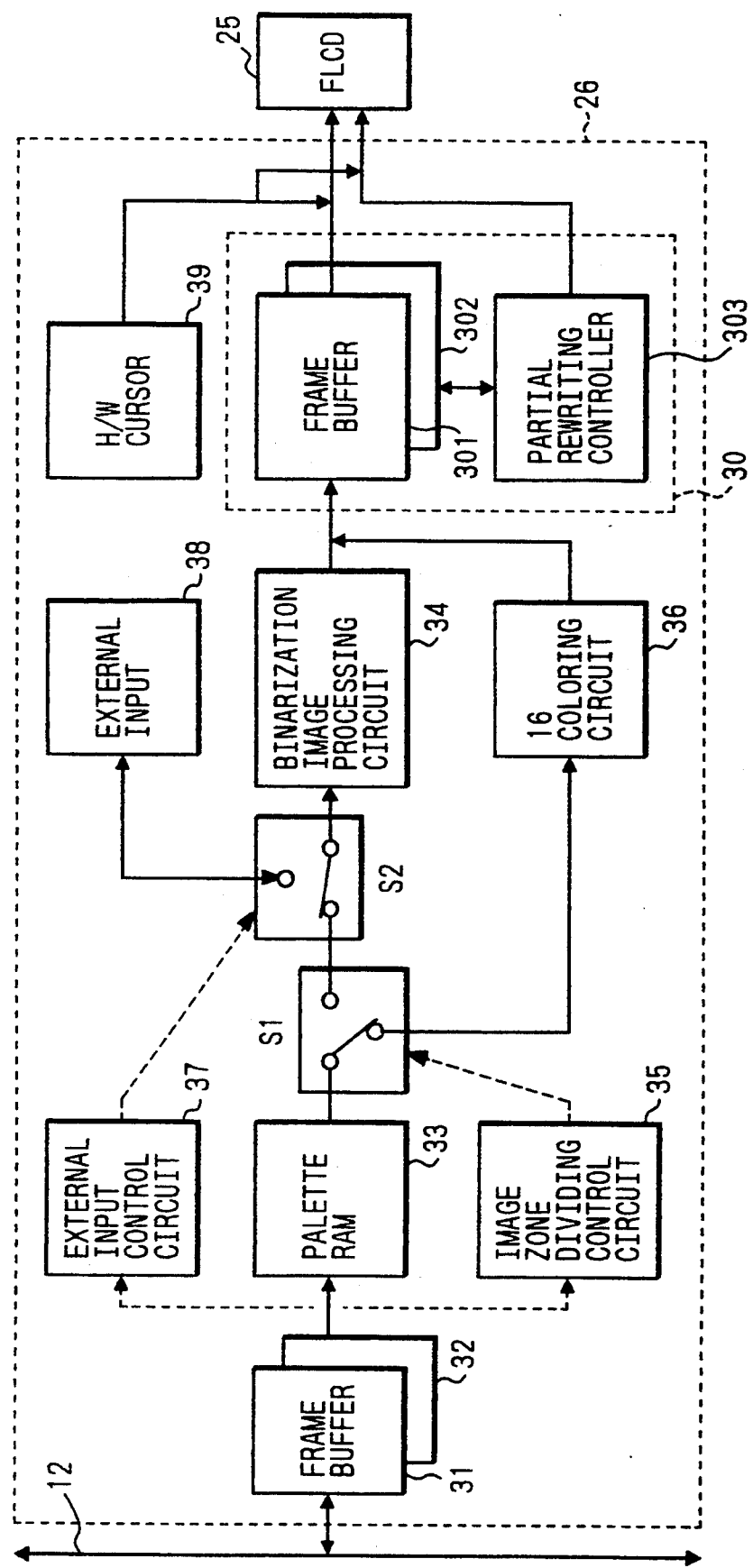
FIG. 2 is a block diagram showing a construction of an FLCD interface as a display control apparatus shown in FIG. 1.

FIG. 2 is a block diagram showing the details of the FLCD interface 26.

Data of either six bits or eight bits which is supplied from the CPU 11 to a frame buffer 31 is once copied into a frame buffer 32. The copied data is supplied from the frame buffer 32 to a binarization image processing circuit 34 through a palette RAM 33 and switches $S_1$ and $S_2$. The data from the frame buffer 32 is also supplied through the switch $S_1$ to a 16 coloring circuit 36. The frame buffer 31 is controlled by a CPU (not shown) in the FLCD interface 26 so as not to copy the data into the frame buffer 32 until the frame buffer 32 finishes the data transfer.

The palette RAM 33 is a CRT palette each data of RGB is constructed by six or eight bits. The palette RAM 33 has 256 indices. The data which has been color converted by the palette RAM 33 is distributed to the following two data by the control of an image zone dividing control circuit 35. That is, the data which is supplied to the binarization image processing circuit 34 and is half-tone processed and is binarized as ON or OFF information every color of RGBI of the display panel; and the data which is supplied to the 16 coloring circuit 36 and is binarized to the ON or OFF information of RGBI on the basis of a simple threshold value. The binarizing process which is executed by the binarization image processing circuit 34 or 16 coloring circuit 36 is performed every plane of RGBI.

The binarization image processing circuit 34, image zone dividing control circuit 35, and the like are disclosed in detail in, for example, Japanese Patent Application Nos. 4-126143, 4-126164 and 4-126168, all of which were filed on May 19, 1992 at the Japanese Patent Office.

An external input control circuit 37 leads the data which is supplied from an external input 38 (for example, video input) to the binarization image processing circuit 34 while communicating with the image zone dividing control circuit 35. The switches $S_1$ and $S_2$ can be also reversely arranged.

The image data converted by the binarization image processing circuit 34 or 16 coloring circuit 36 is supplied to a frame buffer 301 and is transferred as updating line data of a frame buffer 302 and as rewritten delta to the FLCD on the basis of a partial rewriting method, which will be explained hereinlater, by the control of a partial rewriting controller 303.

A hardware cursor (hereinafter, referred to as an H/W cursor) 39 is overlaid to the data from the frame buffer 302 and the data from the partial rewriting controller 303 and is directly drawn on the FLCD 25 without storing cursor image data into the frame buffer 301 or 302. In this instance, the partial rewriting operation is generally executed by the data from the partial rewriting controller 303. However, since it is necessary to refresh the data of one whole frame every few picture planes, the data from the frame buffer 302 is sent to the FLCD. The above control is executed by the control of a CPU (not shown) in the FLCD interface.

Figure 3:
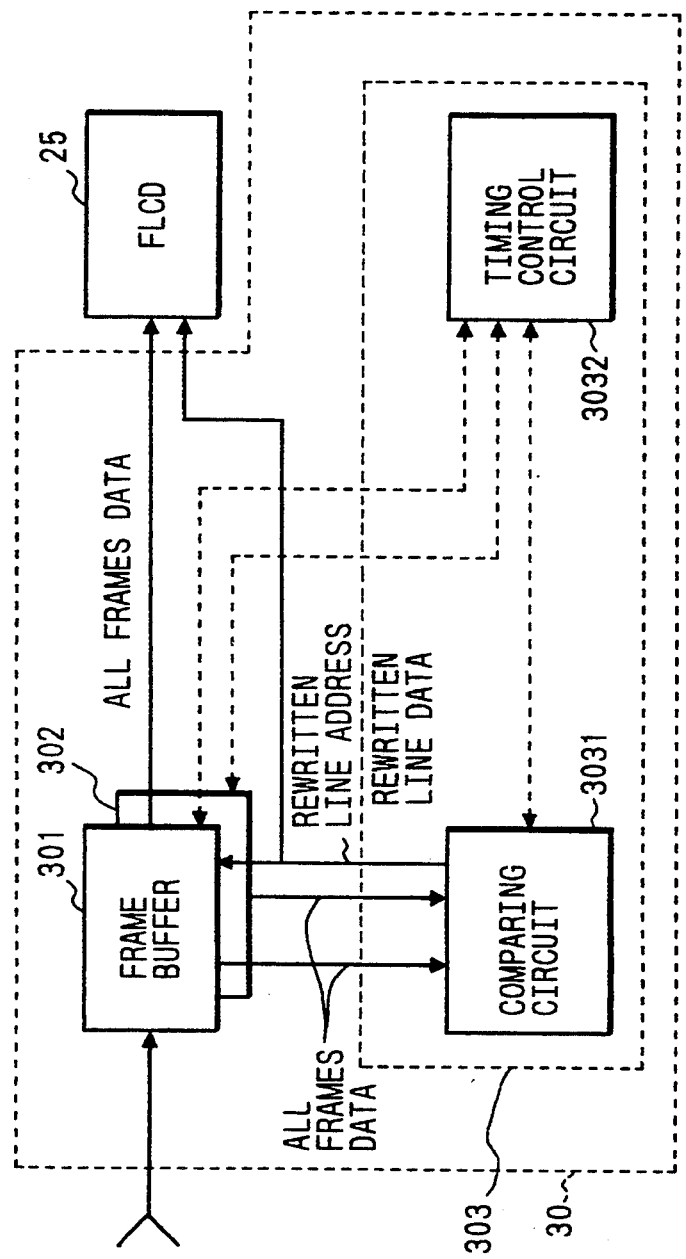
FIG. 3 is a block diagram of the first form of an embodiment of the present invention.
Figure 5:
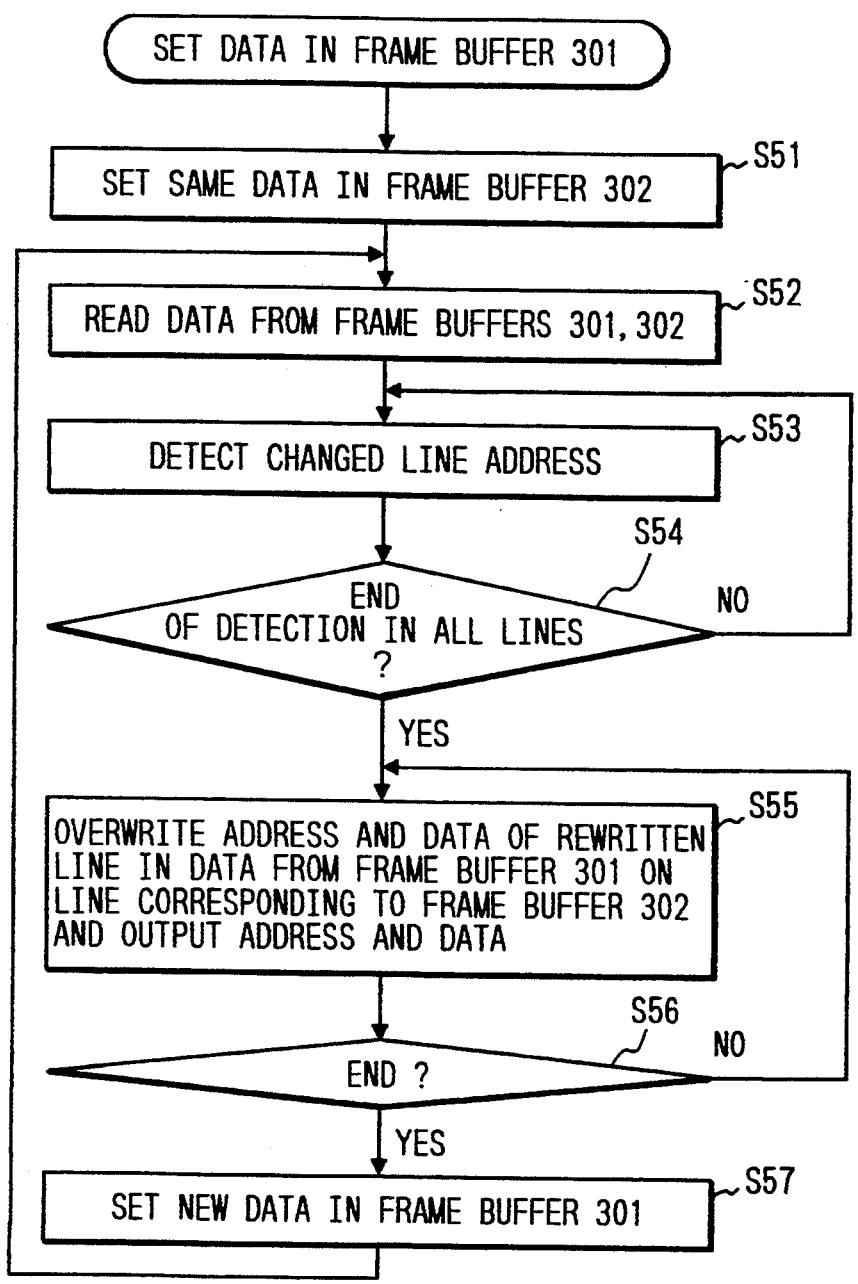
FIG. 5 is a flowchart showing a processing procedure of the first form shown in FIG. 3.

FIG. 3 is a block diagram of an embodiment of the first form of the partial rewriting method. The embodiment of the first form of the partial rewriting method shown in FIG. 3 will now be described with reference to a flowchart of FIG. 5.

When the data of the first picture plane is supplied to the frame buffer 301, the same data is set into the frame buffer 302 in step S51 and this process is performed only when the first data is supplied. In step S52, the data in the frame buffers 301 and 302 is respectively sent to a comparing circuit 3031. In step S53, the address of the changed line (address indicative of the different portion of the frame buffers 301 and 302) is detected and the result of the detection is held in a memory. In step S54, a check is made to see if the detecting process has been finished with respect to all of the lines or not. The process in step S53 is repeated until the completion of the detecting processes with regard to all of the lines. In step S55, the address and data of the changed lines detected in step S53 in the data fetched from the frame buffer 301 are transmitted to the FLCD and are overwritten to the corresponding line in the frame buffer 302. The operation in step S55 is repeated until the completion of the partial rewriting operation to the frame buffer 302 in step S56. In step S57, the data in the frame buffer 301 is updated to new data. The processing routine is returned to step S52. The order of the series of partial rewriting processes described above is controlled by a timing control circuit 3032.

Figure 4:
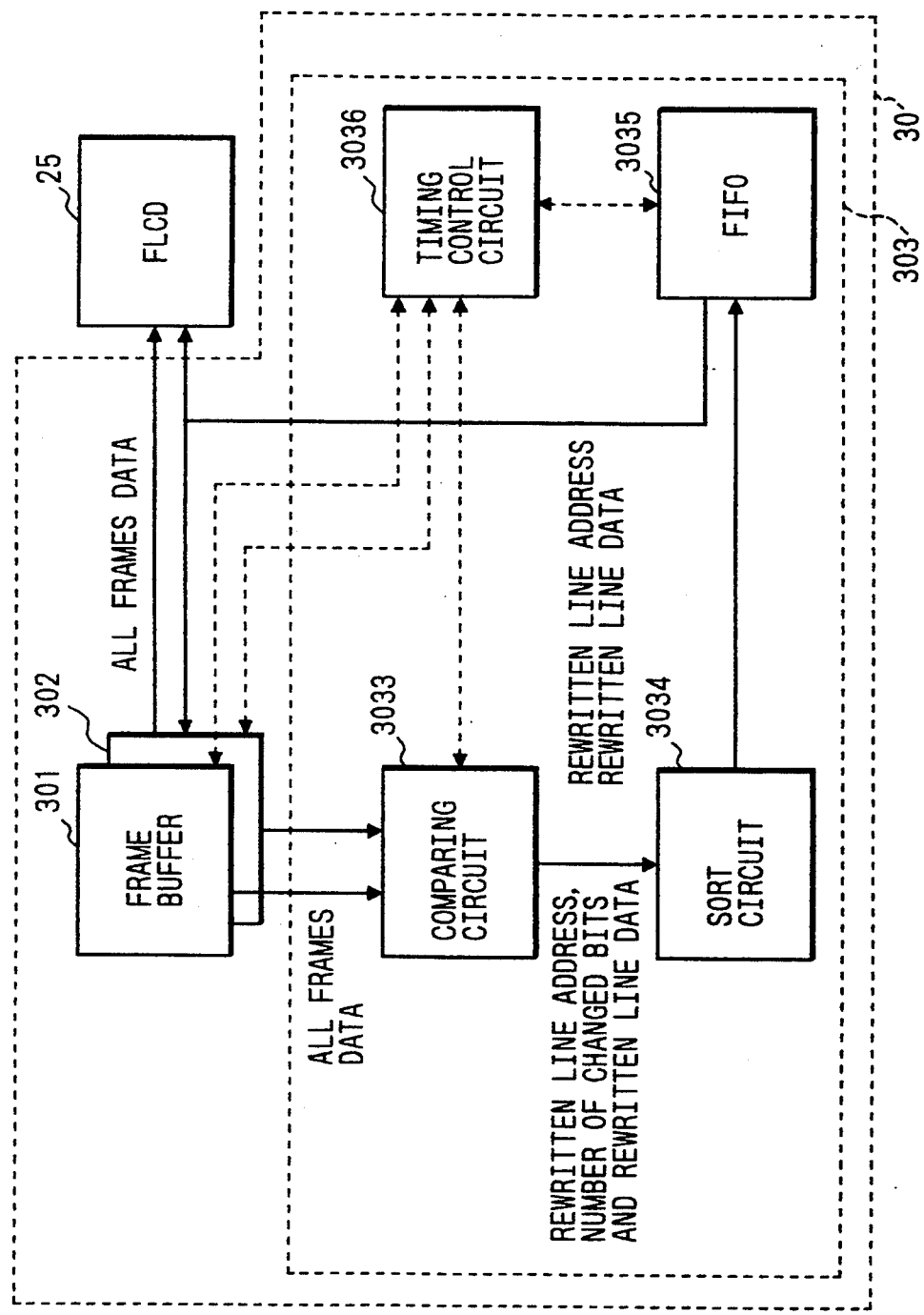
FIG. 4 is a block diagram of the second form of an embodiment of the invention.
Figure 6:
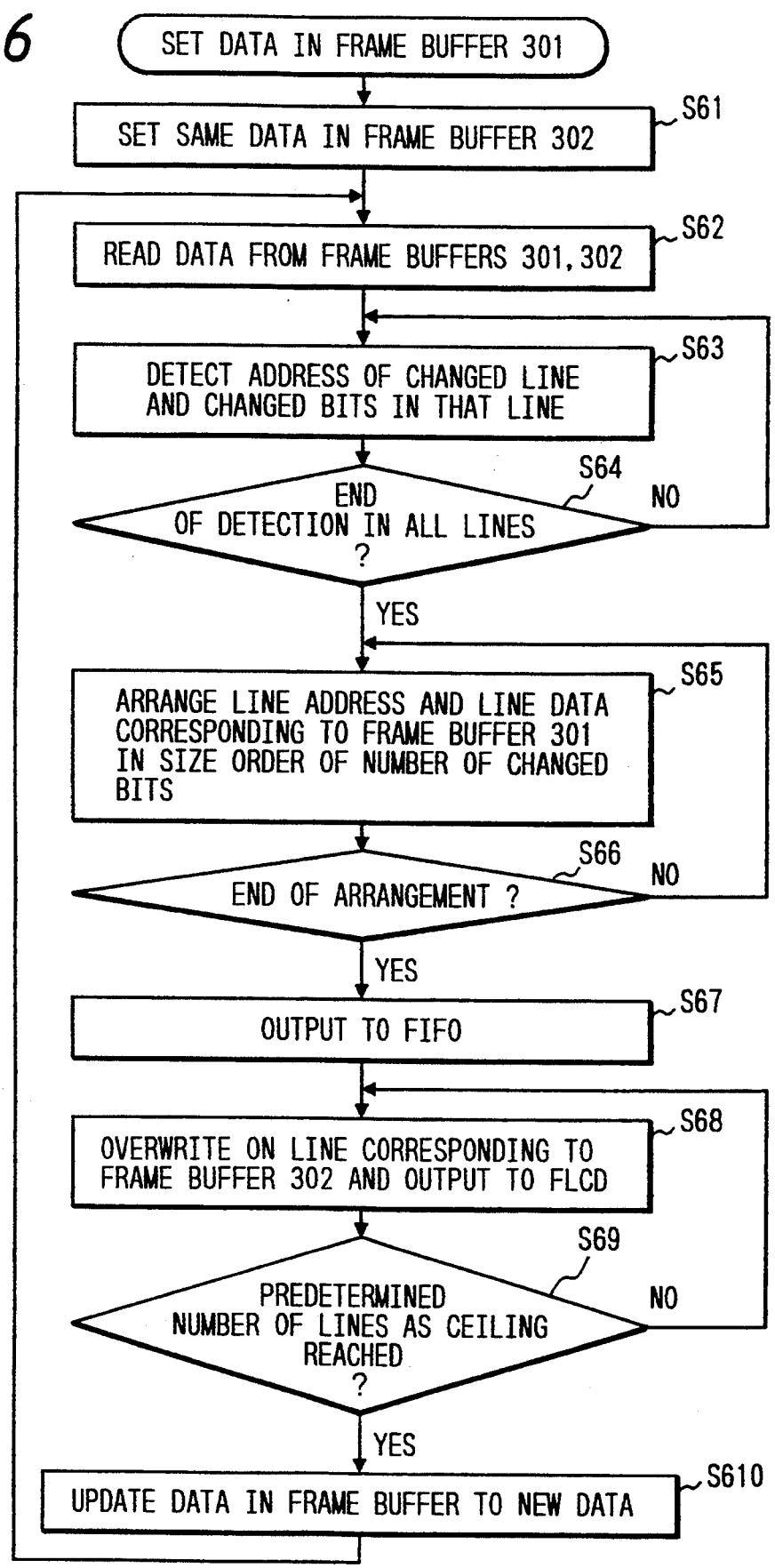
FIG. 6 is a flowchart showing a processing procedure of the second form shown in FIG. 4.

FIG. 4 is a block diagram of an embodiment of the second form of the partial rewriting method. The embodiment of the form shown in FIG. 4 will now be described with reference to a flowchart of FIG. 6 and a data concept diagram of FIG. 7.

Figure 7:
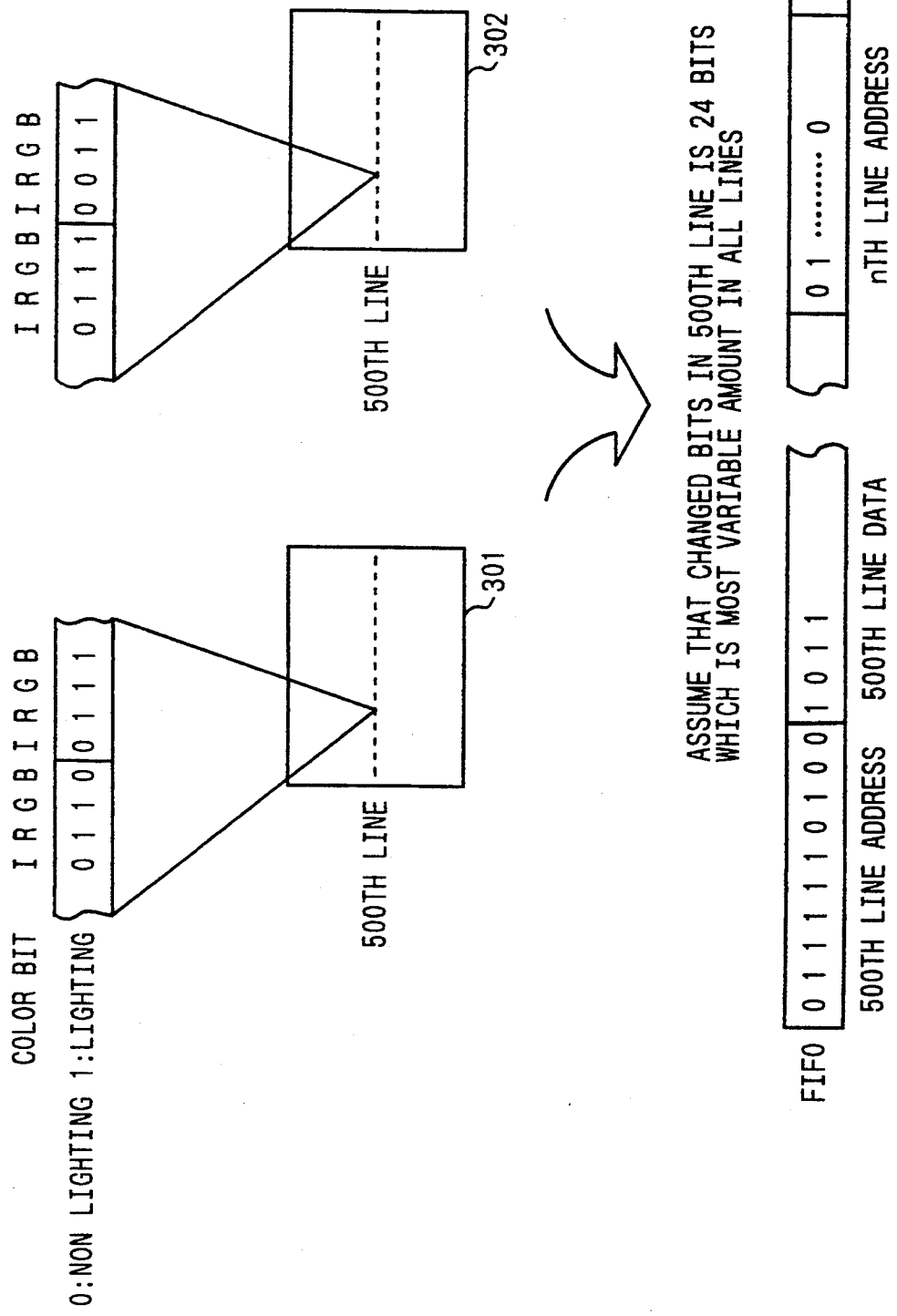
FIG. 7 is a concept diagram of a data comparing and sorting processes of the second form shown in FIG. 4.

When the first data is supplied to the frame buffer 301, the same data is set into the frame buffer 302 in step S61. This process is executed only when the first data is supplied. In step S62, the data in the frame buffers 301 and 302 are respectively transferred to a comparing circuit 3033. In step S63, the address of the changed line (address indicative of the different portion of the frame buffers 301 and 302) and the number of changed bits of such a line are detected. The process in step S63 is repeated until the completion of the detection with respect to all of the lines in step S64. In step S65, the address of the changed line and the number of changed bits which were detected in step S63 and the data of the changed line are transferred to a sort circuit 3034. As shown in FIG. 7, the line data and the line addresses are respectively stored into an FIFO 3035 in accordance with the order of the lines from the line in which the number of changed bits is largest. In FIG. 7, it is now assumed that in the 500th line, the number of bits of the data of the changed line is equal to 24 bits and the change amount is largest among the change amounts of all of the lines. In this case, the line address and line data of the 500th line are stored in the head of the FIFO 3035. In step S68, the data stored in the FIFO 3035 is overwritten to the data in the frame buffer 302 and is also transferred to the FLCD. The FLCD receives the data and updates the rewritten line (line designated by this line address). The partial rewriting process in step S68 is repeated by the line number as an upper limit value which has been predetermined in step S69. After new data was stored in the frame buffer 301 in step S610, the processing routine is returned to the process in step S62. The order of the series of partial rewriting processes described above is controlled by a timing control circuit 3036.

Figure 8:
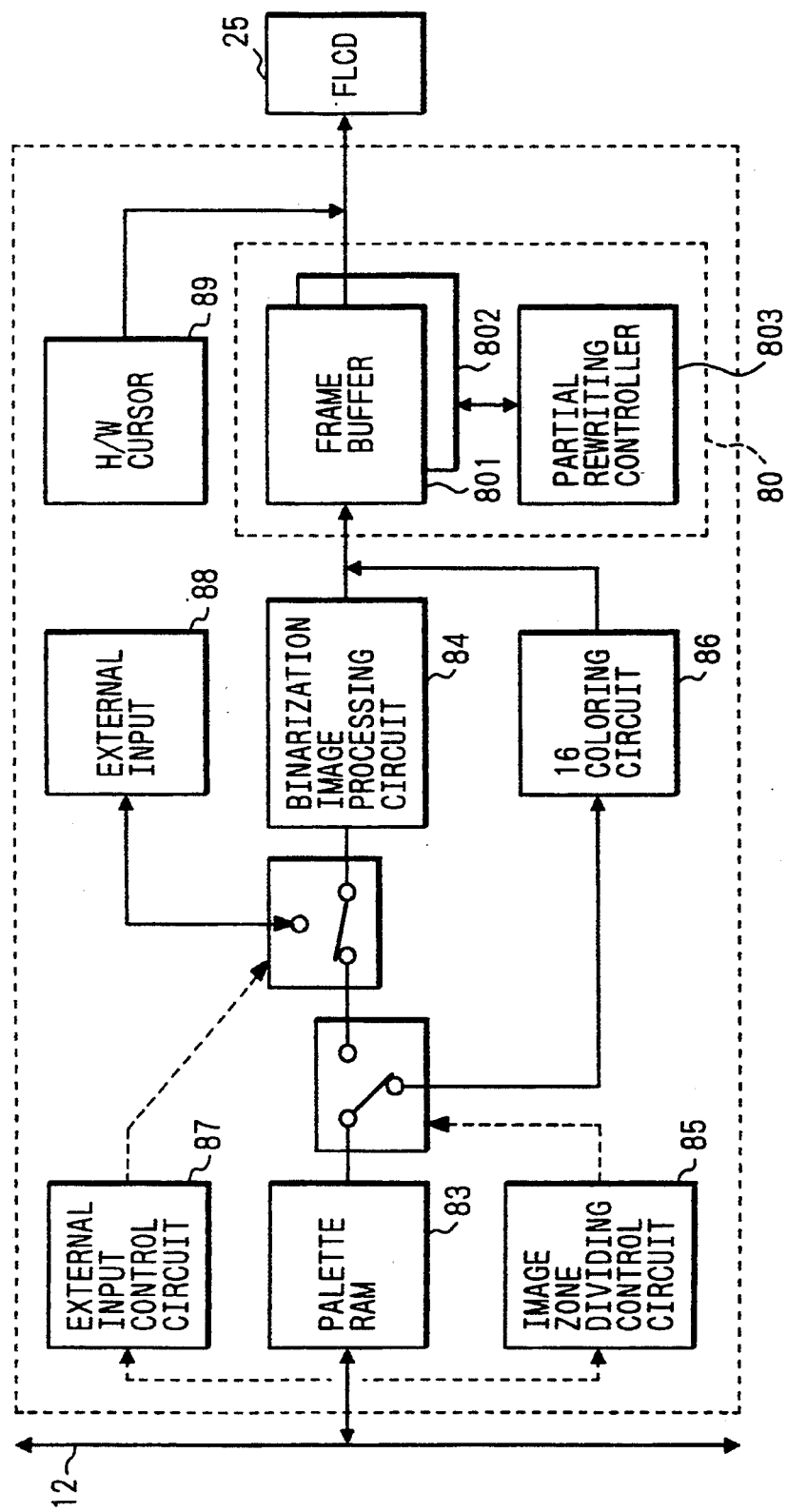
FIG. 8 is a b Lock diagram showing a construction of another form of the FLCD interface shown in FIG. 2.

Although the FLCD interface 26 of the form shown in FIG. 2 has been described, a form as shown in FIG. 8 or 9 is also considered.

FIG. 8 shows the form in which the frame buffers 31 and 32 in FIG. 2 are unnecessary and data is directly inputted/outputted to/from a color conversion palette 83. However, the conversion into a desired format when the data is directly inputted to the palette 83 and the control of an input period are executed by the CPU 11. The other portions are substantially similar to those described in FIG. 2.

According to the embodiments of the invention as described above, a moving image and a still image of a full color and a text of 16 colors or the like can be displayed on the same screen of the FLCD. In the case where the partial rewriting process has been executed by using the second form of the partial rewriting method, those data can be displayed in a real-time manner in response to the data inputting speed.

According to the present invention as described above, an image can be displayed on the display apparatus at a high speed and a high quality.

What is claimed is:

1. A display control apparatus comprising:
   display means for displaying lines of data;
   data storage means for storing data presently displayed on said display means;
   supplying means for receiving updated data and for supplying the update data to said data storage means;
   detecting means for detecting a difference between the updated data being supplied to said supplying means and the data presently displayed on said display means;
   memory means for storing a result of the detection by said detecting means;
   control means for supplying data stored in said data storage means to said display means based on the result of the detection stored in said memory means;
   counting means for counting a number of changed bits in data for a line in which a difference is detected by said detecting means; and
   rearranging means for rearranging the lines of data in descending order of the number of changed bits counted by said counting means for lines in which a difference is detected, wherein
   said control means supplies the data to said display means in accordance with the order of the data as rearranged by said rearranging mean.

2. A display control apparatus comprising:
   first storage means and second storage means for respectively storing display data for displaying one picture plane of a display means, wherein updated data which is to be displayed on said display means is supplied to said first storage means and data which was previously supplied to said display means is stored in said second storage means;
   supplying means for supplying data to the first storage means;
   comparing means for comparing the data stored in the first storage means and the updated data stored in the second storage means, wherein said comparing means executes the comparison for data corresponding to every line of the display means;
   control means for storing data indicative of a different portion between the data in the first and second storage means, in accordance with the comparison performed by said comparing means, in a result memory means, wherein said control means stores a number of changed bits in said result memory means of data for every line in which a difference is detected by said comparing means;
   rearranging means for rearranging an order of supplying data for lines in descending order of the number of changed bits stored in said result memory means; and data supplying means for supplying the data stored in the first storage means to the display means based on the data stored in said result memory means, wherein said data supplying means supplies the data to said display means in accordance with said rearranged order.

3. A display control apparatus as recited in claim 1, wherein said display means comprises a ferroelectric liquid crystal display.

4. A display control apparatus as recited in claim 1, wherein the data includes color data.

5. A display control apparatus as in claim 2, wherein said display means comprises a ferroelectric liquid crystal display.

6. A display control apparatus as in claim 2, wherein the data includes color data.

7. A method for displaying lines of data on a display means, comprising the steps of:
- storing data which is presently being displayed on the display means;
- storing updated data to be displayed on the display means;
- detecting a difference between the updated data and the data presently displayed on the display means;
- counting a number of changed bits in data for a line in which a difference is detected;
- and storing a result of the detecting step;
- rearranging the lines of data in descending order of the number of changed bits for lines in which a difference is detected; and
- supplying the updated data to the display means in the rearranged order.

8. A method for displaying lines of data on a display means, comprising the steps of:
- storing display data for displaying one picture plane of a display means, wherein updated data which is to be displayed on the display means is supplied to a first storage means and data which was previously supplied to the display means is stored in a second storage means;
- comparing the data presently being displayed with the updated data for every line of the display means;
- storing data indicative of a different portion between the data presently being displayed and the updated data, in accordance with a result of the comparing step, wherein a number of changed bits for every line in which a difference is detected is stored;
- rearranging an order of the updated data for lines in descending order of the number of changed bits for each line; and
- supplying the updated data to the display means in accordance with the rearranged order.

* * * * *

UNITED STATES PATENT AND TRADEMARK OFFICE
CERTIFICATE OF CORRECTION

PATENT NO. : 5,379,051
DATED : January 3, 1995
INVENTOR(S) : KAZUMI SUGA, ET AL.

It is certified that error appears in the above-identified patent and that said Letters Patent is hereby corrected as shown below:

ON TITLE PAGE

In [56] References Cited, under FOREIGN PATENT DOCUMENTS:
"0368117  5/1990  European Pat. Off. ." (second occurrence) should be deleted.
"2131286" should read --2-131286--.

COLUMN 1

Line 15, "dips lay." should read --display.--.
Line 21, "LCDS." should read --LCDs.--.
Line 26, "in,-" should read --im- --.
Line 66, "counter measure" should read --countermeasure--.

COLUMN 2

Line 9, "express ion" should read --expression--.
Line 44, "b Lock" should read --block--.
Line 54, "ON" should read --ON--.
Line 61, "discrimination," should read --discriminating--.

COLUMN 3

Line 45, "Screen" should read --screen--.
Line 60, "ma" should read --main--.
Line 61, "in" should be deleted.

COLUMN 4

Line 42, "delta" should read --line data--.

UNITED STATES PATENT AND TRADEMARK OFFICE
CERTIFICATE OF CORRECTION

PATENT NO. : 5,379,051
DATED : January 3, 1995
INVENTOR(S) : KAZUMI SUGA, ET AL.

It is certified that error appears in the above-identified patent and that said Letters Patent is hereby corrected as shown below:

<u>COLUMN 6</u>

Line 20, "update" should read --updated--.

Signed and Sealed this

Eighteenth Day of July, 1995

Attest:

BRUCE LEHMAN

Attesting Officer        Commissioner of Patents and Trademarks